Aug. 14, 1928.
O. E. ANDRUS ET AL
1,680,276
OIL REFINING STILL
Filed Oct. 29, 1927
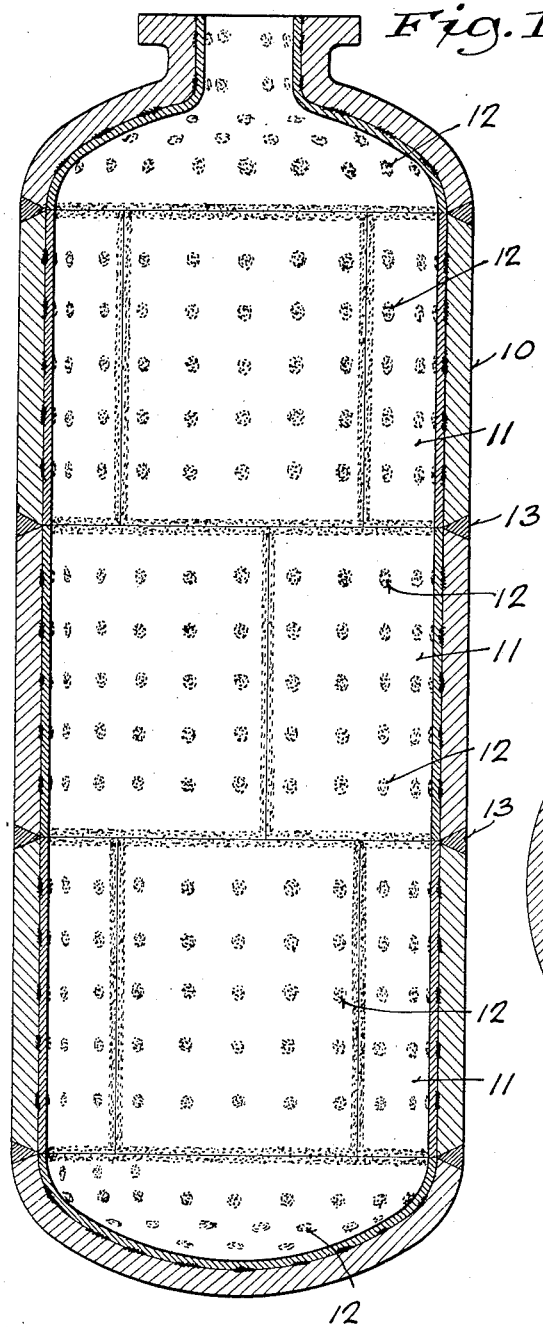
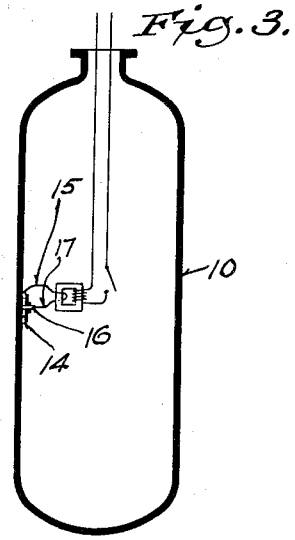
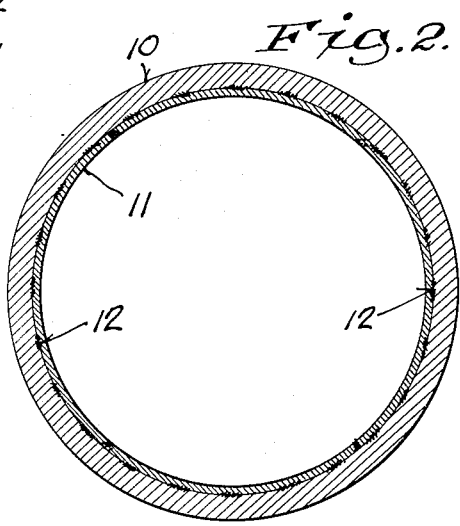
INVENTOR.
ORRIN E. ANDRUS
AND SUNE HERMANSON
BY
ATTORNEYS.

Patented Aug. 14, 1928.

1,680,276

UNITED STATES PATENT OFFICE.

ORRIN E. ANDRUS AND SUNE HERMANSON, OF MILWAUKEE, WISCONSIN, ASSIGNORS TO A. O. SMITH CORPORATION, OF MILWAUKEE, WISCONSIN, A CORPORATION OF NEW YORK.

OIL-REFINING STILL.

Application filed October 29, 1927. Serial No. 229,780.

Our invention relates particularly to stills and other vessels used in the oil refining industry, but it may be used equally as well in other types of vessels in which the steel equipment used is subject to the corrosive action of hot liquids and gases.

The invention resides in a method of making such a still or vessel and providing it with a liner having for its purpose the protection of the inside of the vessel from corrosion and erosion. The liner is formed from sheet metal having characteristics wholly different from those of the metal of the body of the vessel, and has a continuous and unbroken surface in which the characteristics of the metal used as a liner are preserved in their pure state without dilution by metals not having the resistant properties desired.

The invention resides also in such a vessel provided with a liner formed as a thin rolled, imperforate, sheet of corrosion resisting material, chromium alloy, for example, which is attached to the inside walls of the steel vessel with such a frequency of resistance welded areas or bonds that the liner is retained in fixed position in its relation to the body of the vessel, and distortion of the liner or its displacement by rupturing the bonds, due to temperature changes, is prevented.

The passing of the electric current through the liner to heat the parts by resistance and effect their welded union, does not produce any change in the initial characteristics of the metal used as a liner for the vessel. In this particular, our method attains a wholly new result, whereas some of the methods heretofore used in similar attempts to line vessels have produced such a disturbance of the metal of which the liner is constituted, as to lessen its desirability and efficiency for the purposes of our invention, by bringing some of the metal of the vessel to the surface of the liner. In other words, by our method of applying the liner by resistance welding, the metal of the liner is always preserved in its pure state and without the admixture of other metals not possessing the essential resistant properties.

In the application of our method, the closely distributed resistance welded bonds between the liner and the body of the vessel facilitate the rapid transference of heat, and thus contribute to the maintenance of substantially the same temperatures in both the body of the vessel and the liner, and the avoidance of those wide differences in temperature in the still body and the liner, such as heretofore have acted to create destructive stresses upon the bonds, distorting the liner and weakening the bonds. The bonds may be produced by spot welding at frequent and contiguous points, or by bonds as continuous welded lines, extending in divers directions, and so close to each other, that the unwelded areas between the welded lines are very small.

The method of resistance welding which we use in attaching the liner to the vessel enables the connection between the parts to be effected without materially disturbing or roughening the smooth surface of the liner, so that finishing of such surface to remove irregularities is not ordinarily required.

A more detailed statement as to the features residing in the invention will be made in connection with the description of the drawing attached hereto, and the novelty residing in the invention will be pointed out in the appended claims.

In the accompanying drawing:

Figure 1 is a longitudinal, central sectional view of a lined oil refining still constructed in accordance with our invention.

Fig. 2 is a transverse sectional view through the same.

Fig. 3 is a diagrammatic, longitudinal sectional view through the center of a still, such as is illustrated in Figs. 1 and 2, indicating one method by which the liner may be applied to the still.

In the drawing, Figs. 1 and 2, the numeral 10 indicates the hollow body of an oil refining still, or vessel of similar type and purpose, and the numeral 11, a curved, thin sheet metal liner applied thereto, in accordance with our invention. The curvature of the liner is in exact correspondence with that of the body of the still. The liner is shown as exaggerated in proportion to the thickness of the plates forming the body of the still, for the sake of clearness.

Our efforts have been directed to the production of an unbroken liner for vessels which are subject to excessive heat while in use. The liner which we use is constituted as a thin sheet of corrosion resisting material, with satisfactory mechanical and chemical properties and commercial features, such as will render it applicable to oil refinery use. By heated vessels, we mean vessels heated externally or internally, or by heat contained in the charging fluid. Careful analysis of experiments and past failures, caused us to believe that a better heat transfer between the shell or body of the vessel and the liner was the key to the solution of the mechanical difficulties heretofore encountered. We conceived the idea of placing resistance welded bonds, shown in the drawing as spots 12, between the liner 11 and the shell 10, at points sufficiently close to each other so that the heat transfer on cooling or heating, would not set up severe temperature differences in the two metals. To make the liner commercially practical, and at the same time obtain satisfactory chemical properties, that is, to keep the chemical composition of the liner surface uniform or practically uniform over the bonded and unbonded surface, we conceived the idea of resistance welding, and so avoid change in the character of the metal of the liner. There were many factors affecting the mechanical, chemical and commercial properties, so that only by trial and experimentation could the combined effect be determined. As a result of this research, we are able to produce for the first time a satisfactory chromium alloy lined vessel, such vessel and lining being designed for subjection to heat changes, by following the procedure hereinafter outlined.

Sections of the shell are formed and lined, preferably before making up the sections into a complete unit. However, it is also possible to apply the lining after the vessel is partially or completely assembled. We do not limit ourselves to the production of a complete liner, but may only partially line the vessels, as for instance, the vapor region in a cracking still. As a liner, we prefer to use thin sheets of low carbon chromium iron alloy, of approximately 14% chromium, or a low carbon, chromium, nickel, iron alloy of approximately 20% chromium and 10% nickel. However, we do not limit ourselves to any particular alloy containing chromium, but may use any suitable metals or alloys thereof. We find it conducive to the best results to use resistance welding in attaching the liner to the shell by welding at distances of not more than six inches between welded areas, as bonding at greater distances is not satisfactory. We prefer bonding by resistance spot welding at points of about one inch down to continuous lines, as we have found that limitation to give the most satisfactory results with $\frac{1}{16}''$ to $\frac{1}{8}''$ sheet alloy.

We prefer to weld the seams at the meeting edges of the liner sheets by resistance spot welding, but we may use other methods of resistance welding, arc welding, or gas welding for the seams. Our method of welding the liner seams most satisfactorily, is to place a strip of chromium alloy between the meeting edges of the liner, and spot weld at overlapping intervals to produce a continuous bond of the liner sheets along the seams. The surface at the seams may be ground flush after welding, if necessary.

We may employ either of three distinct types of electrode applications in attaching the liner, namely, applying the electrodes from opposite sides of the work, applying both electrodes from the liner side of the work, as shown in Fig. 3, or using the work as one electrode and applying the other electrode to the liner. We prefer to line vessels whose shell is formed from rings to be joined end to end, and arc welded as at 13, since the vessel can be more easily lined in sections than can be a complete vessel. However, we are not limited to arc welding of the shell sections of the vessel, inasmuch as we can line vessels fabricated by riveting, hammer welding, gas welding, resistance welding or forging, following our improved method of applying the liner.

In applying a liner to a vessel section or to a complete body structure, we prefer to use the method illustrated in Fig. 3. This method utilizes two electrodes, 14 and 16, applied to the liner surface. We prefer to weld one spot at a time with a transformer circuit, therefore we use a comparatively small electrode 16, with a comparatively large electrode 14, or group of electrodes. However, we can weld two spots at a time with a transformer circuit, in which case we would use electrodes 14 and 16 of the same size. We connect the electrodes 14 and 16 to the secondary of a transformer, preferably by short leads 15 and 17. The electrodes 14 and 16, supported in any mobile manner, are urged by any suitable compressing means into engagement with the liner 11, the imposed liner thereby being forced into an intimate contact with the inside wall of the body 10, so as to establish a good electrical connection therebetween. When a spot on the liner and an underlying area on the shell have become suitably heated by resistance to the passage of the electrical current, the pressure movement of the electrode 16 will effect the welding of the metals at the heated spot. The mobile compressing means carrying the welding devices will then be adjusted for another welding operation at a predetermined or other point, and the operations repeated, until the whole of the liner 11 has been spotted to the shell at contiguous points distributed over the whole surface of the liner. The resistance spot welding operations effect no appreciable disturbance of the surface of the liner 11, but will leave it in a practically smooth condition, so that only very slight, if any, finishing operations will be necessary. Whatever seams may exist at the meeting edges of the thin plates used in forming the liner will then be closed, preferably by spot welding as before described.

Corrosion of oil refinery equipment is particularly severe in that type of equipment used for cracking petroleum oils. Corrosion in the cracking equipment is largely due to the action of $H_2S$ gas, liberated or formed during the cracking of sulphur bearing oils, on steel at elevated temperatures. The temperatures encountered in oil cracking equipment range from 600° F. to 1000° F. It is well known that $H_2S$ attacks iron rapidly at temperatures above 500° F. The amount and extent of corrosion is such that it renders the equipment unsafe after a comparatively short period of use, such period varying with conditions attending the use of the still, principal among which is amount and type of sulphur occurence in the oil. With very corrosive oils, it is possible for the wall thickness of the still to become reduced as much as $\frac{1}{16}$ inch per month.

Our investigations show that comparatively little has been done in the past with regard to the prevention of corrosion in oil distilling and cracking equipment. The methods of handling corrosive oils are: First, to use thick-walled steel apparatus and allow corrosion to take place; second, to use chemical neutralizing agents; third, to construct apparatus with corrosion resisting walls.

The present tendency is to build a wall sufficiently thick to allow considerable corrosion to take place before the equipment becomes unsafe. This practice is expensive and requires frequent shut-downs for inspection and ascertainment of the wall thickness, and a continually lowering of working pressures to conform with the decreasing wall thickness. Some refineries have attempted, with some success, the use of neutralizing agents, applied within the still during cracking operations, to neutralize the corrosive agents. These include such materials as lime and caustic soda. Chromium plating of refinery equipment has recently been tried, but plating large apparatus of the present type presents considerable difficulties, which, from a practical standpoint, are nearly insurmountable. Chromium and some chromium alloys have been found to be much more resistant to hydrogen sulphide at high temperatures than steel.

Liners in the form of perforated sheets for vessels have been attempted heretofore, but without success. This failure, in practically every case, is due to severe buckling of the liner and oftentimes breaking of the welded bonds, due to insufficient strength to resist the extremes of expansion and contraction produced in the liner and shell, by differences in temperature between the liner and shell. During arc or gas welding operations, on perforated sheets, it is sometimes quite difficult to prevent severe temperature differences between the liner and shell with the resultant stresses and distortion of the liner.

During the starting or stopping operation of the vessels, such for example, as cracking stills, it has been found that the temperature differences between the liner and the shell, have been so pronounced as to make impractical in use all liners heretofore attempted. By mathematical calculation, it is made apparent that the maximum stress per unit area developed by any definite temperature difference between the liner and the shell is independent of the distance between welded areas. This has tended to discourage work on separate liners. By mathematical calculation, it is also apparent that the stress per unit of area, developed by any definite temperature difference between the liner and shell, is inversely proportional to the thickness of the liner, the shell thickness remaining constant. This fact has tended to prevent the use of thin liners, because of cracking and warping. The great expense of perforating the liners and arc or gas welding the bonds, and grinding the inner wall surface so as to free it from deposits by the arc and make it smooth, has limited attempts to line vessels in this manner.

Arc or gas welding through perforations in a liner produces poor quality of corrosion resisting bonds, especially in alloy liners, because of varying composition and porosity existing at the welded points. To our knowledge resistance welding of imperforate liners has never been tried heretofore. Attempts have been made at bonding the perforated liner heavily by arc welding at a few spots and leaving the seams unwelded, the idea being to allow the liner to expand and contract with as few obstructions as possible, so that fewer stresses would develop. This method has not been satisfactory, mainly because of difficulties encountered due to materials getting between the shell and the liner.

Our imperforate thin sheet liner has many features which serve to make it a useful and practical invention. A chromium bearing alloy liner, for example, resists $H_2S$ corrosion very well at temperatures at which steel is rapidly attacked, especially above 500° F. The liner greatly increases the length of life of the vessel in which it is used. The use of such a liner greatly simplifies inspection to ascertain its condition, as in practice it is necessary to drill holes through the still walls, and measure the wall thickness frequently to determine whether the still is safe for further operation at a particular pressure. With a lined vessel such as we have produced, if inspection shows the liner to be intact, no drilling of the shell is necessary, for it is then known that the still walls possess their original thickness. The liner which we have produced is smooth and not subject to warping, as our method avoids the warping of liners due heretofore to unequal rates of expansion or contraction of the liner with respect to the shell. In an oil still, the most severe condition usually occurs during the process of cooling down, preparatory to cleaning or inspection. The liner may cool much more rapidly than the shell, with the tendency to contract faster than the shell. Upon contraction, the liner has a tendency to straighten out between welded areas, and pull away from rather than conform to the curvature of the shell. When the liner thus pulls away and its contact is broken, the heat transfer between it and the shell is greatly reduced, resulting in an increased temperature difference and also increased permanent distortion of the liner.

The liner, as we apply it, is free from this severe warping or distortion. We have been able to accomplish this mostly by increasing the heat conductivity between the liner and shell to such an extent, due to their intimate and frequent points of connection, that the two are essentially at the same temperature at all times, resulting in no unequal expansions or contractions. When the liner is welded at small intervals the liner is necessarily in close engagement with the shell, which increases heat conductivity through the intimate surface contact. However, more important than this, is the heat conductivity through the resistance welded areas, where the liner and shell are integral. Spot resistance welding is therefore especially adaptable to use in applying the liner. The heat developed during resistance welding is very localized, thus eliminating troubles which occur where the welding heat is less restricted.

By using resistance welding, the imperforate liner will have the same chemical composition throughout, including the seams. This condition at the seams is more difficult to accomplish when using arc or gas welding. We have found in arc or gas welding perforated chromium alloys, that chromium is readily oxidized, and that the steel boils up through the perforations and mixes unevenly with the alloy tending to make the corrosive resistance of the weld very low in places, and in such we have also found it almost impossible to produce a liner without blow holes and cracks, which cause porosity, at the welded points.

The use of our method of resistance welding brings the cost of applying the liner within commercial limitations. While we prefer to spot weld the liner to the body of the vessel at bonding points spaced not more than six inches apart, we may also form the bonds as continuous resistance welded lines, extending in divers directions, and having in any area a separation not greater than that specified, and it is to be understood that where in the claims we refer to " points," we contemplate continuous resistance welded lines as well as spot welded areas.

The ends of the vessel, or parts other than of tubular formation, will be lined in the same manner with liners specially shaped to fit such parts.

One essential factor in our invention which enables us to achieve the results desired, resides in the provision of a thin, imperforate, sheet liner of corrosion resisting metal or alloy, which is welded through the liner and to the shell or body of the vessel without disturbing the characteristics of the metal constituting the liner. While we have referred to chromium as a suitable metal, other metals and alloys having the necessary resistant properties, may be used for the purposes of our invention.

Having thus described our invention, what we claim and desire to secure by Letters Patent of the United States, is:

1. The method of lining vessels, which comprises the operations of securing a liner within the vessel by disposing a thin imperforate sheet of corrosion resisting alloy against the inner wall of the body of the vessel, and bonding the said liner to the said body by electrical welding at frequent and contiguous points through the liner without changing the nature of the liner, to thereby prevent distortion of the liner from its position in the vessel by temperature differences and provide for an increased transference of heat between the liner and the body of the vessel.

2. The method of lining vessels, which comprises the operations of securing a liner within the vessel by disposing a thin imperforate curved sheet of chromium alloy against the curved inner wall of the body of the vessel, and bonding the said liner to the said body by electrical resistance welding at frequent and contiguous points, to thereby prevent distortion of the liner from its position in the vessel by temperature differences and provide for an increased transference of heat between the liner and the body of the vessel.

3. The method of lining vessels, which comprises the operations of securing a liner within the vessel by disposing thin imperforate sheets of chromium alloy against the inner wall of the body of the vessel, and bonding the said lining sheets to the said body by electrical resistance welding at frequent and contiguous points, and welding the sheets to the body of the vessel at their meeting edges, to thereby prevent distortion of the liner from its position in the vessel by temperature differences and provide for an increased transference of heat between the liner and the body of the vessel.

4. The method of lining vessels, which comprises the operations of securing a liner within the vessel by disposing thin imperforate curved sheets of chromium alloy against the inner wall of the body of the vessel, and bonding the said lining sheets to the said body by spot welding at frequent and contiguous points, to thereby prevent distortion of the liner from its position in the vessel by temperature differences and provide for an increased transference of heat between the liner and the body of the vessel, arranging a strip of like alloy between the meeting edges of the sheets, and successively spot welding along the seams to form a continuous bond between abutting sheets and the body of the vessel.

5. The method of lining vessels, which comprises the operations of securing a liner within the vessel by pressing a thin imperforate sheet of chromium alloy against the inner wall of the body of the vessel to make a good electrical contact, passing an electrical current through the parts at the point of their contact to heat the same, applying pressure to the said liner at the heated point to weld it to the body of the vessel, and repeating the operations until the liner has been welded to the body at frequent and contiguous points, to hold the liner against distortion from its position in the vessel by temperature differences and provide for an increased transference of heat from the liner to the body of the vessel.

6. The method of lining vessels which comprises the operations of securing a liner within the vessel by disposing a thin imperforate sheet of corrosion resisting alloy against the inner wall of the body of the vessel, and bonding the said liner to the said body by spot welding at frequent and contiguous points, to prevent distortion of the liner from its position in the vessel by temperature differences and provide for an increased transference of heat between the liner and the body of the vessel.

7. The method of lining vessels, which comprises the operations of securing a liner within the vessel by pressing a thin imperforate sheet of chromium alloy against the inner wall of the body of the vessel to make a good electrical contact, passing an electrical current through the parts at the point of contact to heat the same to weld the liner to the body at the point of contact, and repeating the operations until the liner has been welded to the body at frequent and contiguous points, to prevent distortion of the liner from its position in the vessel by temperature differences and provide for an increased transference of heat between the liner and the body of the vessel.

8. The method of lining vessels for use in oil refining or like purposes, which comprises the operations of securing a liner within the vessel by disposing a thin perforate sheet of corrosion resisting alloy against the inner wall of the body of the vessel, and bonding the said liner to the said body by resistance welding at places not more than six inches apart, to thereby prevent distortion of the liner from its position in the vessel by temperature differences and provide for an increased transference of heat between the liner and the body of the vessel.

9. The method of lining vessels for use in oil refining or like purposes, which comprises the operations of securing a liner within the vessel by disposing a thin imperforate sheet of chromium alloy against the inner wall of the body of the vessel, and bonding the said liner to the said body by spot welding at places not more than six inches apart, to thereby prevent distortion of the liner from its position in the vessel by temperature differences and provide for an increased transference of heat between the liner and the body of the vessel.

10. A vessel for use in oil refining or other purposes, comprising a body or shell and a liner therefor, the said liner being constituted of a thin, imperforate, sheet of chromium alloy having corrosion resisting properties, arranged in close engagement with the inside wall of the body of the vessel and attached thereto by resistance welding at frequent and contiguous points to thereby prevent distortion of the liner from its position in the vessel by temperature changes and afford increased heat transference between the liner and the body of the vessel.

11. A vessel for use in oil refining or other purposes, comprising a body or shell and a liner therefor, the said liner being constituted of thin, imperforate, sheet metal of corrosion resisting properties, arranged in close engagement with the inside wall of the body of the vessel and attached thereto by resistance welding at frequent and contiguous points to thereby prevent distortion of the liner from its position in the vessel by temperature changes and afford increased heat transference between the liner and the body of the vessel.

12. A vessel for use in oil refining or other purposes, comprising a body or shell and a liner therefor, the said liner being constituted of thin, imperforate, sheet metal of corrosion resisting properties, arranged in close engagement with the inside wall of the body of the vessel and attached thereto by spot welding at frequent and contiguous points to thereby prevent distortion of the liner from its position in the vessel by temperature changes and afford increased heat transference between the liner and the body of the vessel.

13. A vessel for use in oil refining or other purposes, comprising a body or shell and a liner therefor, the said liner being constituted of a thin, imperforate, sheet of chromium alloy having corrosion resisting properties, arranged in close engagement with the inside wall of the body of the vessel and attached thereto by spot welding at frequent and contiguous points to thereby hold the liner against distortion from its position in the vessel by temperature changes and afford increased heat transference between the liner and the body of the vessel.

14. A vessel for use in oil refining or other purposes, comprising a body or shell and a liner therefor, the said liner being constituted of thin, imperforate, metal sheets of corrosion resisting properties, arranged in close engagement with the inside wall of the body of the vessel and permanently attached thereto by resistance welding at points close to each other, to thereby prevent distortion of the liner from its fixed position in the vessel by temperature changes and afford increased heat transference through the welded bonds between the liner and the body of the vessel, the meeting edges of the sheets being resistance welded to the body of the vessel on continuous lines to close the joints and produce a liner of uniform, initial characteristics.

15. A vessel for use in oil refining or other purposes, comprising a body or shell and a liner therefor, the said liner being constituted of thin, imperforate, chromium alloy sheets of corrosion resisting properties, arranged in close engagement with the inside wall of the body of the vessel and permanently attached thereto by resistance welding at points close to each other to thereby prevent distortion of the liner from its fixed position in the vessel by temperature changes and afford increased heat transference through the welded bonds between the liner and the body of the vessel, the meeting edges of the sheets being resistance welded to the body of the vessel on continuous lines to close the joints and produce a liner of uniform, initial characteristics.

16. A vessel for use in oil refining or other purposes, comprising a body or shell and a liner therefor, the said liner being constituted of thin, imperforate, metal sheets of corrosion resisting properties, arranged in close engagement with the inside wall of the body of the vessel and permanently attached thereto by spot welding at points close to each other to thereby prevent distortion of the liner from its fixed position in the vessel by temperature changes and afford increased heat transference through the welded bonds between the liner and the body of the vessel, the meeting edges of the sheets being resistance welded to the body of the vessel on continuous lines to close the joints and produce a liner of uniform, initial characteristics.

17. A vessel for use in oil refining or other purposes, comprising a body or shell and a liner therefor, the said liner being constituted of thin, imperforate, chromium alloy sheets of corrosion resisting properties, arranged in close engagement with the inside wall of the body of the vessel and permanently attached thereto by spot welding at points close to each other to thereby prevent distortion of the liner from its fixed position in the vessel by temperature changes and afford increased heat transference through the welded bonds between the liner and the body of the vessel, the meeting edges of the sheets being resistance welded to the body of the vessel on continuous lines to close the joints and produce a liner of uniform, initial characteristics.

In testimony whereof we have signed our names at Milwaukee, Wisconsin, this 14th day of October, 1927.

ORRIN E. ANDRUS.
SUNE HERMANSON.